(12) United States Patent
Anton et al.

(10) Patent No.: US 7,187,817 B2
(45) Date of Patent: Mar. 6, 2007

(54) AWG COUPLER FOR SEPARATING ELECTROMAGNETIC RADIATION OF VARIOUS WAVELENGTH REGIONS, AND A TELECOMMUNICATIONS SYSTEM

(75) Inventors: Andrea Anton, Bad Kreuznach (DE); Tobias Kälber, Mainz (DE); Detlef Wolff, Mainz (DE); Manfred Lohmeyer, Nackenheim (DE); Matthias Brinkmann, Mainz-Kastel (DE); Klaus Gerstner, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/471,397

(22) PCT Filed: Mar. 8, 2002

(86) PCT No.: PCT/EP02/02538

§ 371 (c)(1),
(2), (4) Date: Apr. 30, 2004

(87) PCT Pub. No.: WO02/079810

PCT Pub. Date: Oct. 10, 2002

(65) Prior Publication Data

US 2004/0170354 A1    Sep. 2, 2004

(30) Foreign Application Priority Data

Mar. 13, 2001  (DE)  .............. 101 12 331.0

(51) Int. Cl.
*G02B 6/34* (2006.01)
*C03B 37/018* (2006.01)
*H04J 14/02* (2006.01)

(52) U.S. Cl. ............. 385/14; 385/129; 385/130; 385/131; 385/46; 65/391; 65/385; 65/386; 398/84; 398/87; 398/63

(58) Field of Classification Search .......... 385/14, 385/37, 129, 130, 131, 132, 46; 65/391, 65/385, 386; 398/84, 87, 63
See application file for complete search history.

(56) References Cited

U.S. PATENT DOCUMENTS

| 5,745,616 | A | 4/1998 | Zirngibl ............. 385/37 |
| 6,094,513 | A * | 7/2000 | Rigny et al. ......... 385/24 |
| 6,243,402 | B1 * | 6/2001 | Doerr ................ 372/20 |
| 6,282,344 | B1 | 8/2001 | Bergmann et al. ..... 385/46 |
| 2003/0030879 | A1 * | 2/2003 | Chen et al. .......... 359/237 |

FOREIGN PATENT DOCUMENTS

| EP | 0936483 | 8/1999 | ........... 385/37 X |
| EP | 0984304 | 3/2000 | ........... 385/37 X |
| WO | WO 99/21308 | 4/1999 | ........... 385/37 X |
| WO | WO 00/41015 | 7/2000 | ........... 385/37 X |

* cited by examiner

*Primary Examiner*—Brian M. Healy
(74) *Attorney, Agent, or Firm*—Ohlandt, Greeley, Ruggiero & Perle, L.L.P.

(57) ABSTRACT

A single free-beam region for coupling electromagnetic radiation in and out is provided in order in the case of an AWG coupler for spectrally separating electromagnetic radiation to achieve a more stable thermal characteristic and a space-saving layout.

12 Claims, 7 Drawing Sheets

AWG COUPLER FOR SEPARATING ELECTROMAGNETIC RADIATION OF VARIOUS WAVELENGTH REGIONS, AND A TELECOMMUNICATIONS SYSTEM

BACKGROUND OF THE INVENTION

1. Field of the Invention

The invention relates to an AWG (Arrayed Wave Guide Grating) coupler for spectrally separating electromagnetic radiation that has various frequency or wavelength regions.

2. Description of Related Art

Such couplers are used in information processing and telecommunications engineering to separate signal-carrying optical bands of electromagnetic radiation of different wavelength.

Figure 2:
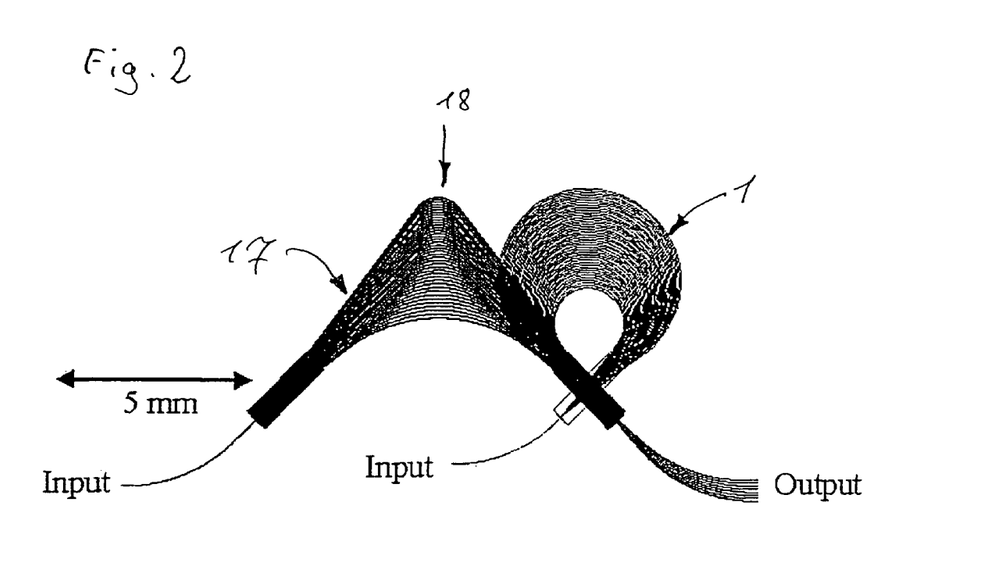
FIG. 2 shows the comparison between a standard layout and the inventive design, it being possible substantially to resolve the same wavelength differences of both systems in conjunction with similar performance properties.

Previous AWG couplers normally have the design illustrated in the left-hand half of FIG. 2, which takes up a relatively large area. Very small bending radii occur in part in the various arms of the previously known coupler, which respectively serve to produce optical path length differences, as a result of which emission losses and instances of influence on the effective refraction index which impair the performance properties of the coupler can occur.

SUMMARY OF THE INVENTION

It is an object of the invention to provide an AWG coupler of the generic type that has a smaller spatial extent.

This is achieved in a way that is of most highly surprising simplicity merely by means of an AWG coupler as disclosed herein.

If this AWG coupler has a 1-to-N transmission region, in particular as a free-beam region for coupling electromagnetic radiation in and out, it is possible by contrast with the prior art to achieve drastic savings with reference to the space required on the optical substrate.

Moreover, owing to the lower space requirement such a design also has substantially improved thermal properties, since a stable temperature distribution or constancy of the temperature distribution is easier to achieve in the case of smaller substrates than in the case of the conventional elongated AWG designs.

Furthermore, it is highly advantageous for the conventional coating techniques when smaller surface regions are to be coated, since it is possible thereby to keep the process parameters required and, in particular, the refractive index differences Δn very much more homogeneous, as a result of which the properties of the AWG coupler, such as, for example, narrowbandedness or selectivity thereof, can also be improved.

Since the substrate area required features quadratically as a rule in the production costs of the couplers, the inventive AWG coupler has not only substantially improved performance properties, but can also, moreover, be fabricated more cost-effectively.

If the free-beam region of the AWG coupler is configured such that it is possible to guide both radiation entering the AWG coupler and radiation exiting from the AWG coupler, it is possible thereby for the guidance of beams or waves to the external terminals and into the various arms of the coupler to be implemented in a space-saving fashion with the aid of only a single optical module, specifically with the aid of the star coupler that covers the free-beam region.

In a preferred way, the free-beam region covers a star coupler that is designed, for example, as a double star coupler such that the electromagnetic radiation coupled in and that to be coupled out overlap. As a result, it is possible to create particularly space-saving arrangements in the case, in particular, when a plurality of sets of arms associated with one another are in each case assigned, in a fashion angularly offset in groups in each case, to a group of entering electromagnetic radiation and exiting electromagnetic radiation.

If electromagnetic radiation exiting from a first set of arms is fed in the case of such an arrangement to a second set of arms, it is possible to achieve substantially steeper filter properties with a single multiple AWG coupler arrangement.

In a particularly preferred way, the arms of the AWG coupler, which define the optical path length difference, are coupled to an exit surface and to an entry surface of one beam coupler, and this permits not an elongated design as in the prior art, but a closed design that has the advantageous reduced dimensions described.

In a particularly preferred way, the AWG coupler has no sharp bends in the arms which define the optical path length difference, but the arms are arranged on a substantially lobar line, as a result of which it is possible to reduce substantially emission losses and a worsening of the selectivity of the AWG coupler.

A particularly preferred embodiment of the AWG coupler comprises a two-dimensional surface wave conductor that is applied to a substrate as a PECVD (Plasma enhanced Chemical Vapor Deposition) layer system and, in particular, as a PICVD (Plasma induced Chemical Vapor Deposition) layer system.

Furthermore, the invention permits the advantageous provision of spatially reduced cost-effective telecommunications systems that are less susceptible to the effect of temperature and have an improved performance.

BRIEF DESCRIPTION OF THE DRAWINGS

The invention is described in more detail below with the aid of preferred embodiments and with reference to the enclosed drawings, in which.

DETAILED DESCRIPTION OF THE INVENTION

In the following description of preferred embodiments, reference is firstly made to FIG. 1, which illustrates the surface layout of an inventive AWG coupler that is denoted overall by the reference numeral 1.

This AWG coupler 1 is designed as a two-dimensional waveguide arrangement in the surface of an optical substrate, and is constructed by means of PECVD techniques, in a preferred way by means of PICVD techniques, as an appropriate layer system with differences in refractive index, and permits the electromagnetic beams to be guided reliably in the respective waveguides.

The figures respectively show illustrations which are true to scale for the purpose of explaining the inventive layout, and have scales that are specified in the unit of μm.

Figure 1:
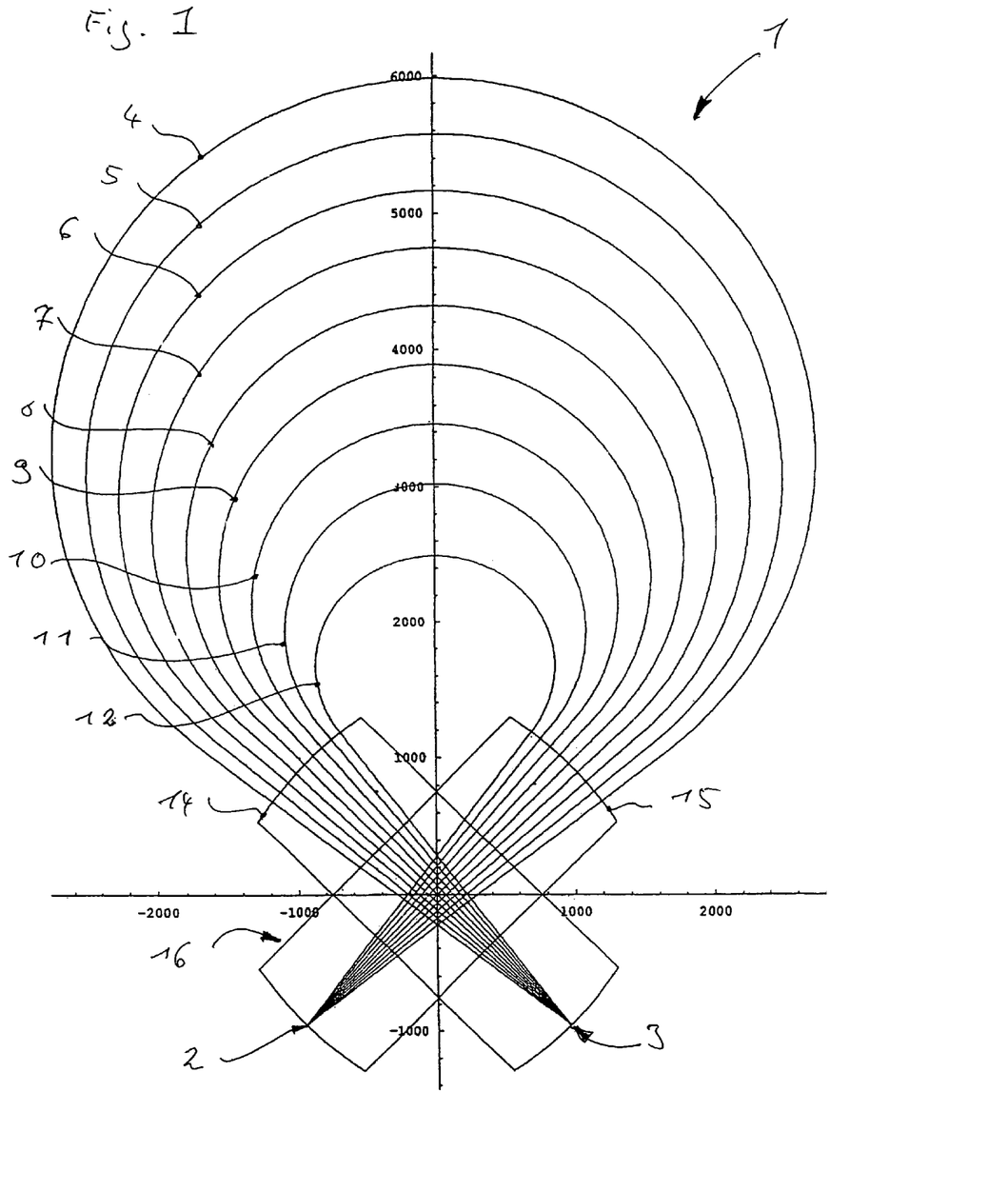
FIG. 1 shows the surface layout of an inventive AWG coupler, indicating how the latter extends in the surface of an optical substrate.

The AWG coupler 1 from FIG. 1 is a 200 GHz AWG coupler with a central wavelength of 1.55 μm that is fitted with an input channel 2 and eight output channels of which only the output channel marked by the reference numeral 3 is illustrated by way of example.

The AWG coupler 1 comprises forty arms of which only in each. case every fifth arm 4 to 12 is illustrated in the figures. The arms 4 to 12 respectively produce in steps another optical path length difference, and preferably have a constant optical path length difference in each case between two neighboring arms.

The arms 4 to 12 are connected to an exit surface 15 and to an entry surface 14 of the star coupler 16 such that radiation entering the input channel 2 from the star coupler 16 is uniformly projected onto the arms 4 to 12 at the exit surface 15.

The electromagnetic radiation moving through the arms 4 to 12 will arrive at the exit surface 14 with a defined transit time difference and after the effect of a predetermined dispersion defined by the layer system, and is provided by the star coupler 16, in a fashion that is separated spectrally or into respective wavelength regions, at eight outputs thereof.

Figure 9:
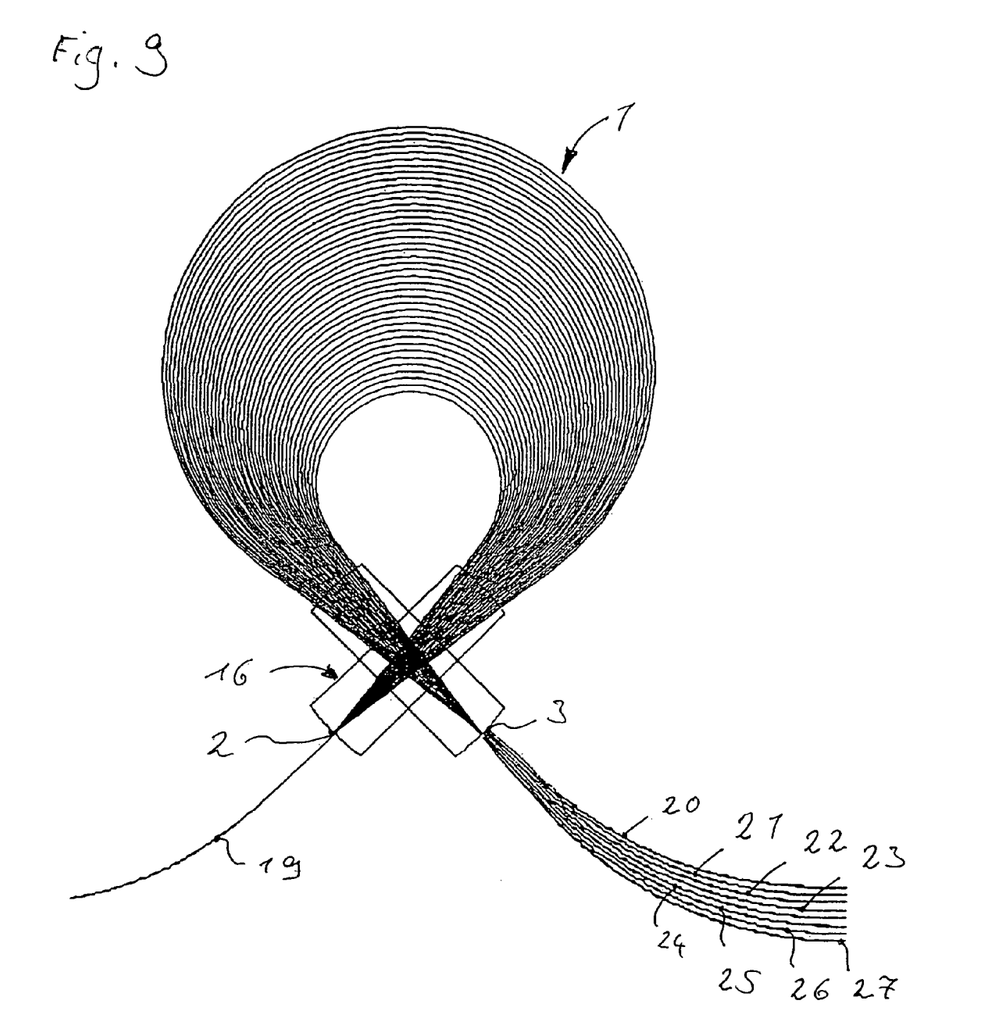
FIG. 9 shows an AWG coupler provided with incoming and outgoing lines.

Of these eight outputs, only the output channel 3 is illustrated by way of example. However, the person skilled in the art in this field will certainly know both the design of a star coupler and also the connection of output channels to the outputs thereof, and this is illustrated in FIG. 9 by way of example.

Reference is made. below to FIG. 2, which illustrates a conventional AWG coupler, indicated by the reference numeral 17, in its two-dimensional extent in an exact comparison of size with the inventive AWG coupler 1.

Figure 3:
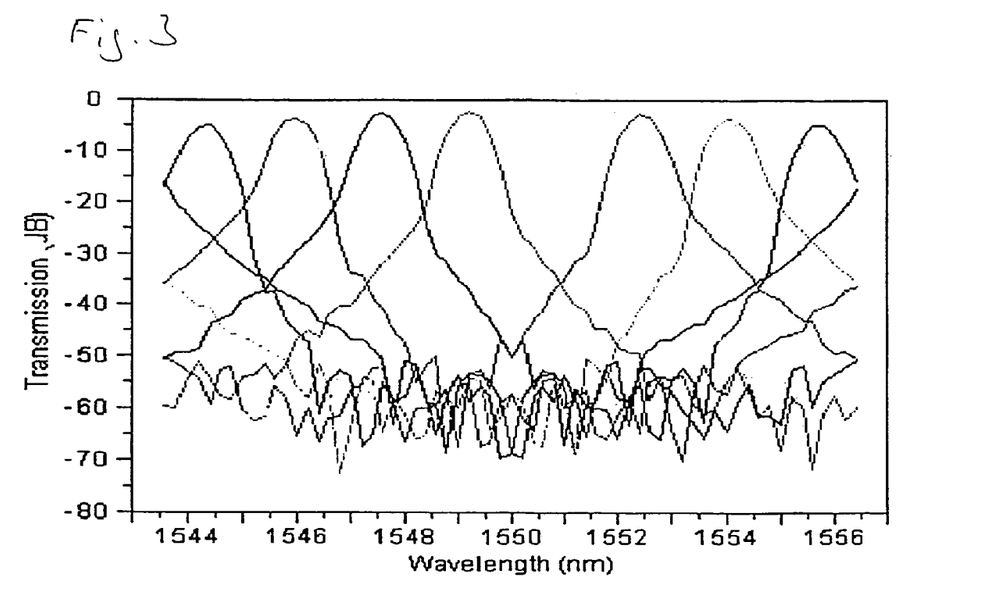
FIG. 3 shows the spectral resolution of the conventional and inventive AWG couplers.

FIG. 3 shows the spectral resolution as a function of wavelength for the conventional and for the inventive AWG coupler 1, and from this the outstanding selectivity of the latter in conjunction with a lower space requirement is yielded unambiguously. In FIG. 3, each first peak is assigned to the conventional AWG coupler, and each second peak is assigned to the inventive AWG coupler 1.

In each case, identical reference numerals are used in the following description of further inventive embodiments for components that are identical or have an identical effect.

Figure 4:
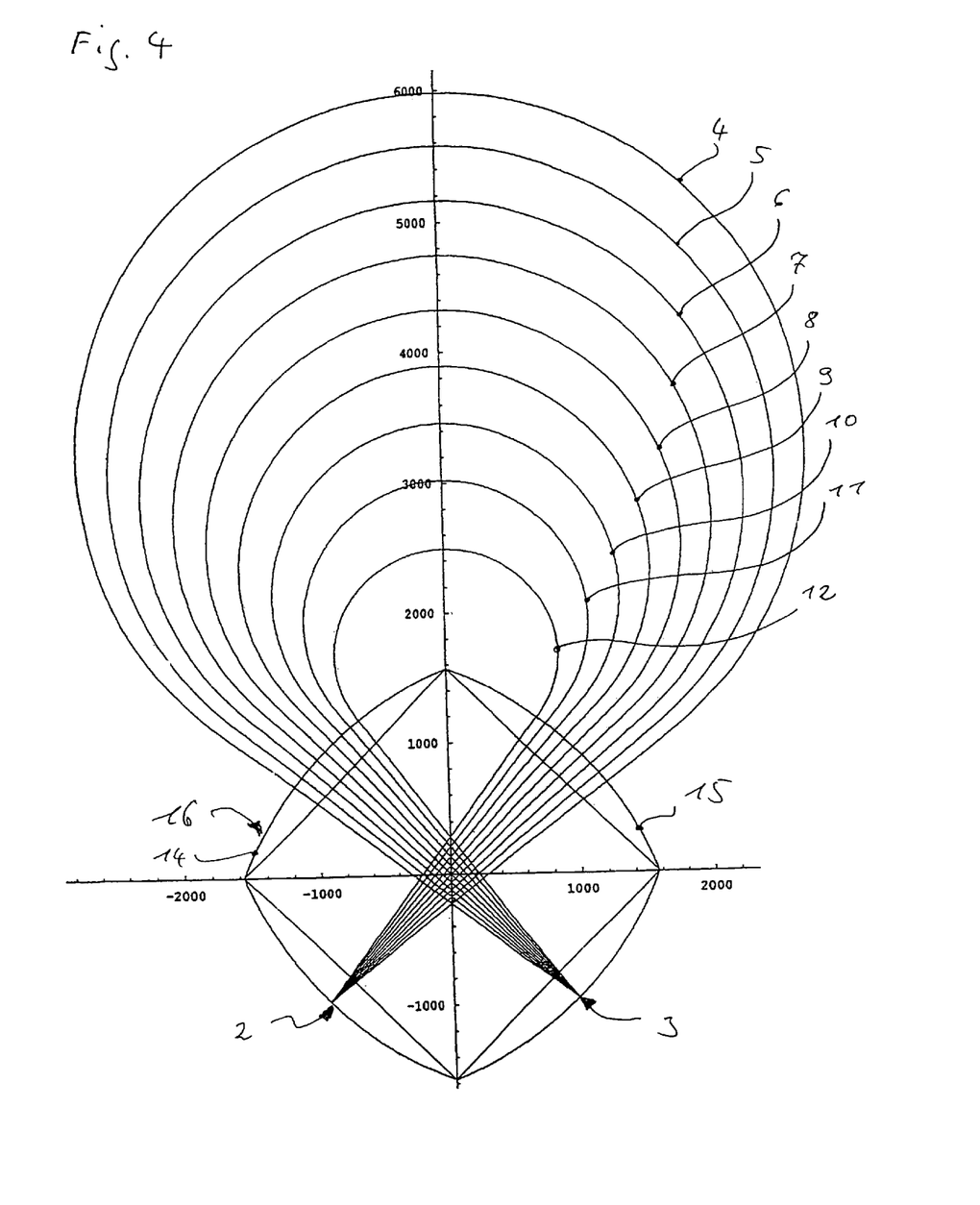
FIG. 4 shows a second inventive embodiment of the AWG coupler, which has an enlarged free-beam region.

The second inventive embodiment, illustrated in FIG. 4, of the AWG coupler 1 likewise shows a representation to scale in μm data with an enlarged free-beam region of the star coupler 16. In the case of this AWG coupler as well as of the AWG coupler 1 of the first inventive embodiment, and preferably in the case of the star couplers of the further inventive embodiments, the arms 4 to 12 lie on virtually circular to lobar sections that have clear smaller bending radii than the upper region 18 of the conventional AWG coupler. This freebeam region defines a 1-to-N transmission region within which a transmission from one to N optical paths or from N optical paths to one optical path is provided. For example, in the embodiments presented here, N has a value of 36 or 40, standing for 36 or 40 arms.

Figure 5:
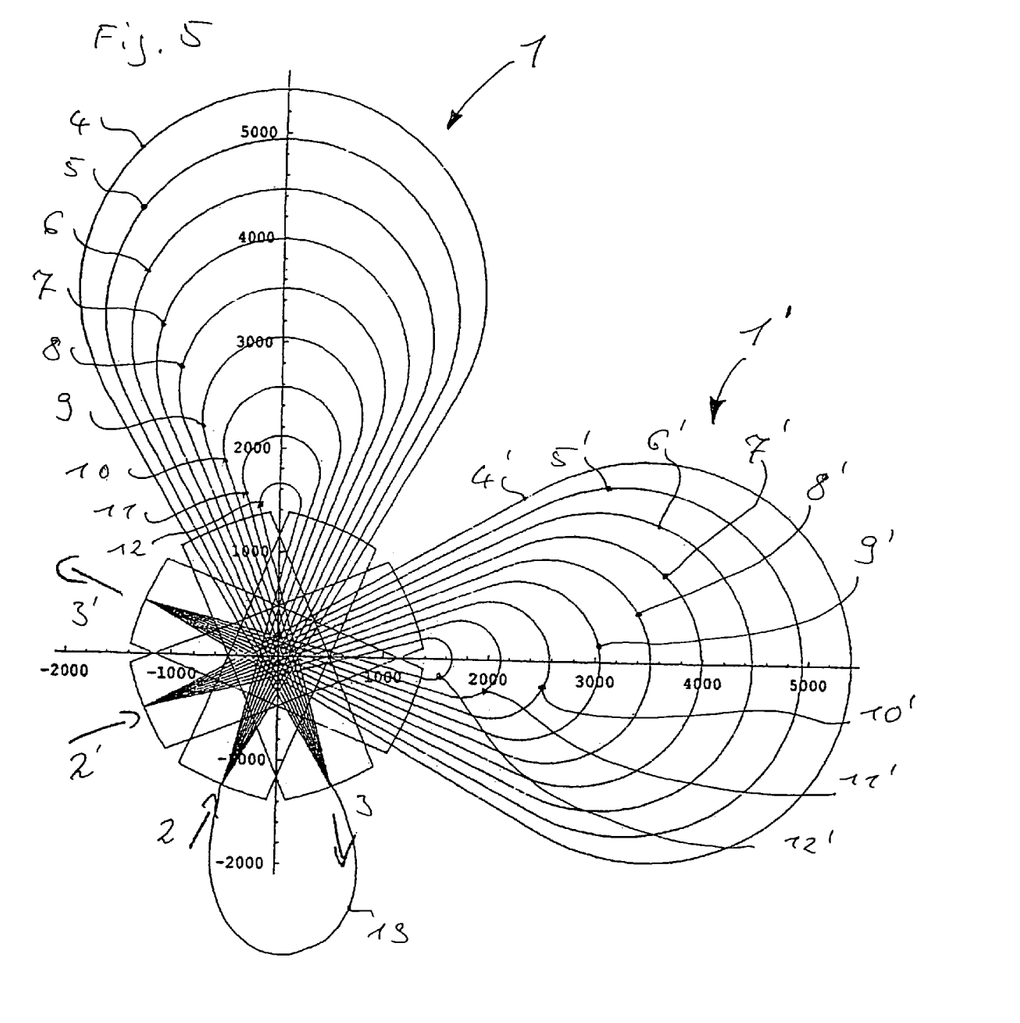
FIG. 5 shows the layout of a third inventive embodiment, in which two AWG couplers divide a free-beam region.

FIG. 5 illustrates a layout in which two AWG couplers 1, 1' divide a free-beam region 16 and in which two sets of arms 4 to 12 and 4' to 12' are in each case assigned, in a fashion angularly offset in groups in each case, to a group of entering electromagnetic radiation and exiting electromagnetic radiation.

If, in a further refinement, the two AWG couplers are cascaded in such a way that, as illustrated in FIG. 5, the output of the first AWG coupler 1 is connected with the aid of an optical conductor 19 to the input of the second AWG coupler 1', it is possible thereby to achieve a substantially enhanced separation.

Figure 6:
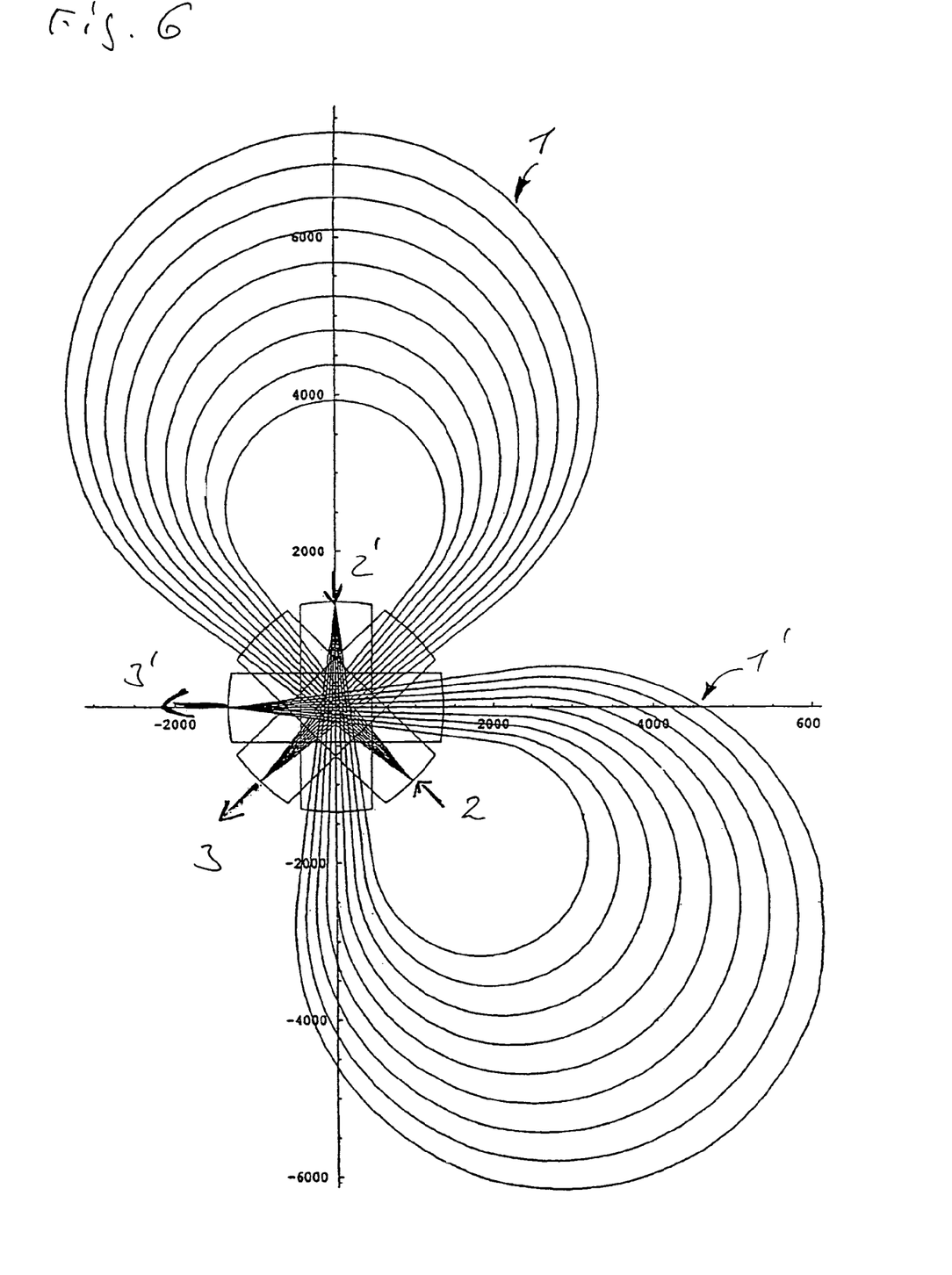
FIG. 6 shows a layout which is similar to FIG. 5 and in the case of which the input channel of the first AWG coupler crosses the paths of the second AWG coupler.

FIG. 6 illustrates a layout similar to FIG. 5 in which the entrance channels 2, 2' are connected in a space-saving fashion inside the arms of the respective AWG coupler 1, 1'.

Figure 7:
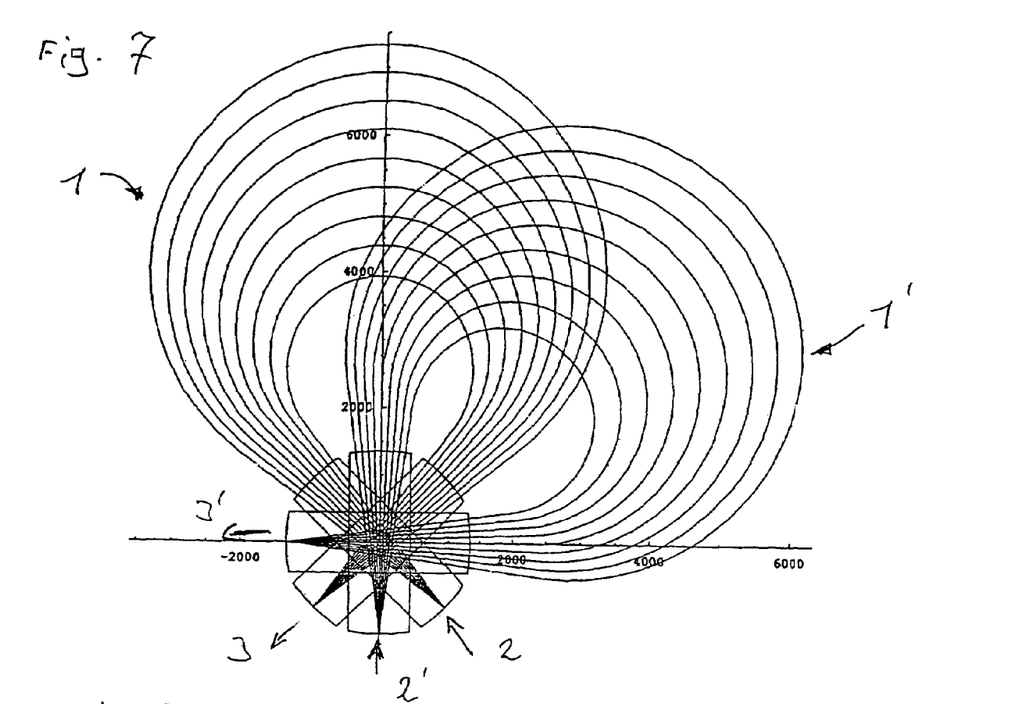
FIG. 7 shows a layout which is similar to FIG. 6 and in the case of which the arms of the two AWG couplers penetrate one another.

FIG. 7 shows a layout in which the arms 4 to 12 and 4' to 12' of the two AWG couplers 1, 1' penetrate one another in order, once again, to save further space and to obtain further advantages of the athermalization.

Figure 8:
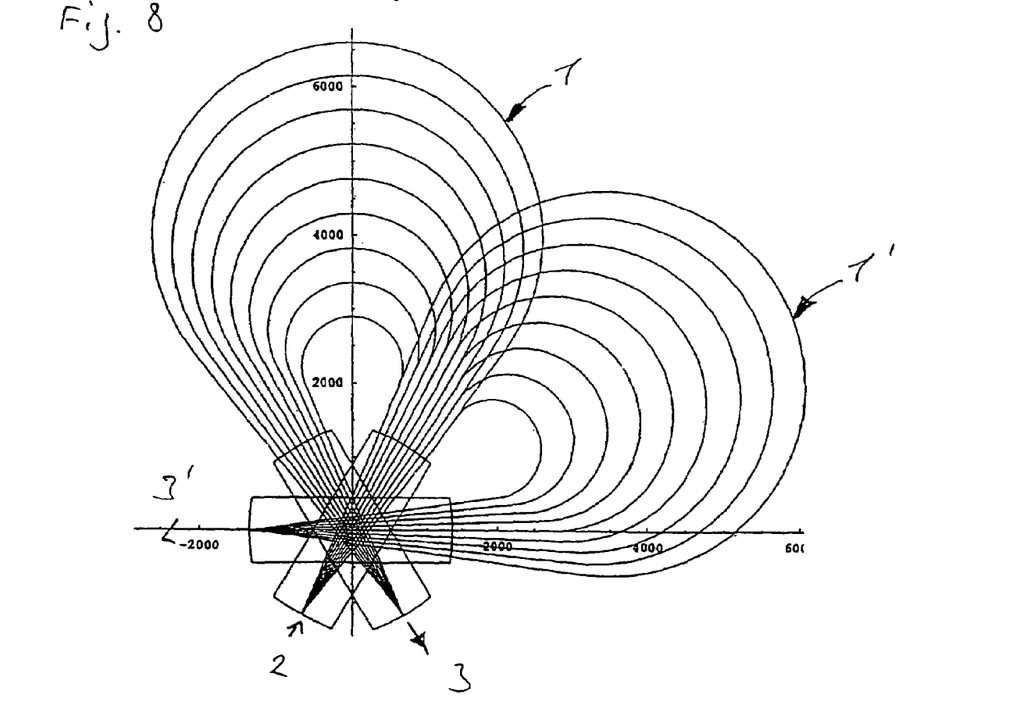
FIG. 8 shows a double AWG coupler arrangement in the case of which the electromagnetic radiation is distributed downstream of the free-beam region between two asymmetrically arranged AWG couplers, and is coupled out in two output channel groups with substantially half the intensity.

FIG. 8 shows a double AWG coupler 1, 1', in which the electromagnetic radiation from an input channel 2 is distributed downstream of the free-beam region 16 with substantially the same intensity between two asymmetrically arranged AWG couplers 1, 1', and is coupled out with essentially half the intensity in each case in two output channel groups 3, 3'. This yields a beam divider function that advantageously provides two output channels 3, 3' with spectrally separated signals given only one input channel 2.

FIG. 9 shows an illustration of the principle of an inventive AWG coupler 1 that is provided with one incoming line 19 at its input channel 2 and outgoing lines 20 to 27 at its output channel 3.

The invention claimed is:

1. An AWG coupler for spectrally separating electromagnetic radiation, comprising:
   a 1-to-N transmission region for coupling in and coupling out electromagnetic radiation, and
   a plurality of arms that define an optical path length difference, the plurality of arms being coupled to an exit surface and an entry surface so that the plurality of arms lie on a lobar line, wherein the AWG coupler is a two-dimensional surface wave conductor applied to a substrate as a PECVD layer system.

2. The AWG coupler as claimed in claim 1, wherein the 1-to-N transmission region is a free-beam region that can guide both electromagnetic radiation entering the AWG coupler and electromagnetic radiation exiting from the AWG coupler.

3. The AWG coupler as claimed in claim 2, wherein the free-beam region defines a star coupler.

4. The AWG coupler as claimed in claim 3, wherein the star coupler is a double star coupler so that the electromagnetic radiation coupled in and coupled out overlap.

5. The AWG coupler as claimed in claim 1, wherein the plurality of arms are angularly offset to a group of entering electromagnetic radiation and exiting electromagnetic radiation.

6. The AWG coupler as claimed in claim 5, wherein electromagnetic radiation exiting from a first set of arms is fed to a second set of arms.

7. A telecommunications system comprising:
an AWG coupler having a plurality of arms that define an optical path length difference, the plurality of arms being coupled to an exit surface and an entry surface so that the plurality of arms lie on a lobar line, wherein the AWG coupler is a two-dimensional surface wave conductor applied to a substrate as a PECVD layer system.

8. The telecommunications system as claimed in claim 7, wherein the 1-to-N transmission region is a free-beam region that can guide both electromagnetic radiation entering the AWG coupler and electromagnetic radiation exiting from the AWG coupler.

9. The telecommunications system as claimed in claim 8, wherein the free-beam region defines a star coupler.

10. The telecommunications system as claimed in claim 9, wherein the star coupler is a double star coupler so that the electromagnetic radiation coupled in and coupled out overlap.

11. The telecommunications system as claimed in claim 7, wherein the plurality of arms are angularly offset to a group of entering electromagnetic radiation and exiting electromagnetic radiation.

12. The telecommunications system as claimed in claim 11, wherein electromagnetic radiation exiting from a first set of arms is fed to a second set of arms.

* * * * *